Feb. 8, 1955  J. J. BAKER  2,701,602
FRAME FOR BABY SUPPORT
Filed June 15, 1950
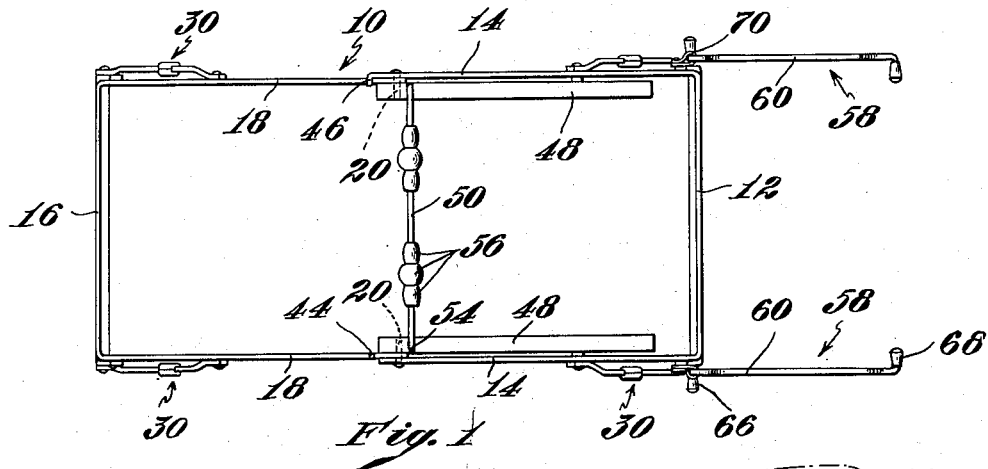
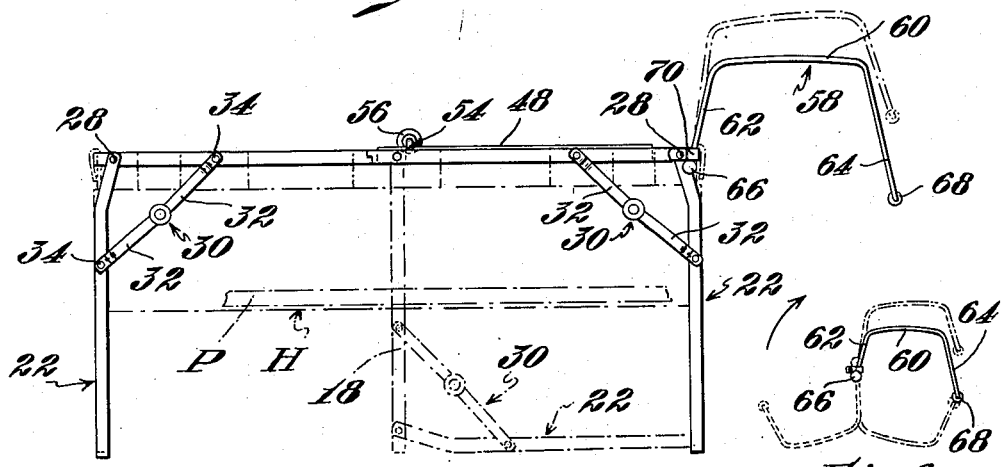
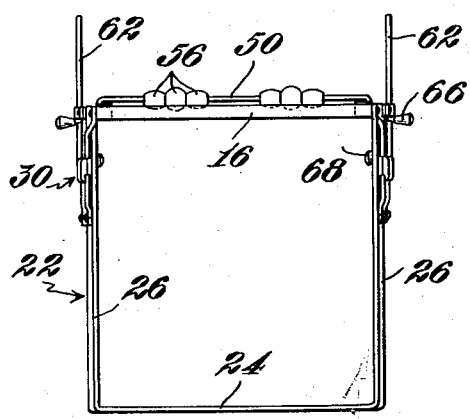
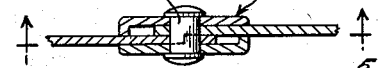
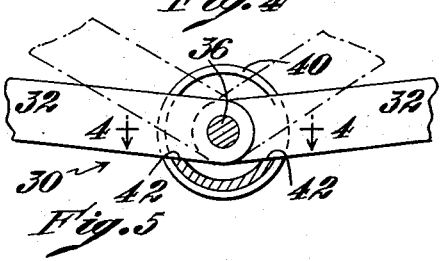
Inventor
James J. Baker
by Roberts, Cushman & Groover
Attys

United States Patent Office 2,701,602
Patented Feb. 8, 1955

2,701,602

FRAME FOR BABY SUPPORT

James J. Baker, Wakefield, Mass., assignor to Marfisa Baker, Incorporated, Wakefield, Mass., a corporation of Massachusetts Application June 15, 1950, Serial No. 168,342

6 Claims. (Cl. 155—44)

This invention relates to improvements in a collapsible combination infant's bed and seat for use primarily in automobiles although it is to be understood that it may be employed as a temporary bed or seat for outdoor use or in the home.

The principal objects of the invention are to provide a combination bed and seat which may be hung at different heights on the back of a car seat depending upon whether it is to be used as a bed or a chair seat; which may easily be converted from a bed to a seat and vice versa; and in which the parts will afford in use a rigid non-collapsible structure and yet which may be collapsed when desired to take up very little space.

As illustrated, the convertible combination car bed and seat has a frame on which is hung a hammock-type structure for receiving a pad or mattress and has at one end a pair of two position hangers for supporting that end of the frame from the back of the car seat. The hangers are pivotally fastened to the corners of the frame and each is substantially U-shaped, having one leg longer than the other. The hangers are slidable and rotatable relative to the means attaching them to the corners of the frame for movement from a position in which the shorter leg is engaged with the attaching means to a position in which the longer leg is engaged with the attaching means. This may be done by sliding the hanger lengthwise from one end to the other, swinging it laterally through approximately 180° of rotation and then turning it about its point of attachment to the frame until it is in the correct position for use.

The frame comprises two rigid U-shaped parts, and has hinged legs and when in one position of use the frame forms a hollow rectangular support from which is hung the hammock bed and in another position of use forms a box like seat in which the hammock forms the back and bottom. Normally the leg members are held substantially at right angles to the frame parts by carriage hinges. To prevent buckling of the U-shaped frame parts when they are disposed in a common plane for use as a bed, lugs are struck out from the arms of one of the frame parts for engagement with notches formed in the upper edges of the arms of the other U-shaped frame part. The hinged frame parts may be swung to place one of the frame parts substantially at right angles to the other, with the leg associated therewith beneath the other frame part and with its lower end engaged with the lower end of the other leg to form a rigid box-like seat frame, open at the front.

The invention will now be described in greater detail with reference to the accompanying drawings wherein:

Fig. 1 is a plan view of the combination bed and seat, shown in the position in which the parts are disposed when the device is used as a bed;

Fig. 2 is a vertical side elevation of Fig. 1 showing the parts extended for use as a bed and in broken lines for use as a seat;

Fig. 3 is a vertical end elevation of the device looking from the left end as seen in Fig. 2;

Fig. 4 is a horizontal section through the carriage hinge which holds the legs distended with respect to the frame;

Fig. 5 is an elevation, showing details of the carriage-type hinge joint used for holding the legs in operative position, said view being on larger scale than that of the preceding figures;

Fig. 6 indicates the operations involved in moving one of the hangers from one position of use to the other.

Referring to the drawings, the frame 10 is made up of two rigid, substantially U-shaped members, one having an end 12 and parallel arms 14 and the other having an end 16 and parallel arms 18. The arms 14 and 18 of the U-shaped frames are pivotally joined together in overlapping relation by rivets 20 or other suitable means. In one position of use, the composite frame is substantially rectangular and provides a support from which may be hung a hammock bed H (parts of which are shown in broken lines) in which may be placed a mattress or other pad P, Fig. 2. Legs 22 are provided for supporting the composite frame both as a bed and a seat. Each leg consisting of a substantially U-shaped frame having a bottom span 24, Fig. 3, and vertical legs 26, the upper ends of which are pivotally attached to the outer sides of the respective U-shaped frame members near their closed ends by rivets 28. To hold the legs distended from the composite frame when the device is used as a bed, toggle devices or so-called "carriage-type" hinges 30 are provided, each of which consists of a pair of arms 32, each pivotally connected at one end to the frame and leg respectively by rivets 34, and at their other ends to each other by a pivot pin 36, Figs. 4 and 5. The connected ends are joined by a conventional construction to permit the toggle to break in one direction but to be resistant to folding in the opposite direction and to this end the arms adjacent to the rivets 36, enter a hollow button 38 through slots 40 which permit the arms to swing in one direction about the pin 36. Abutments 42 at the ends of the slots prevent the arms from swinging in the opposite direction. By use of such a hinge injury to fingers by pinching and catching of clothing in the hinges is minimized. To hold the U-shaped frame parts distended in a common plane when the device is being used as a bed, there is provided latch means which as illustrated, is constituted by notches 44—44 formed in the upper edges of each of the arms 18 within which are seated lugs 46—46 struck inwardly from the ends of the respective arms 14. The lugs prevent the frames from bending downwardly at their hinge point, but permits them to bend upwardly.

Arm rests 48 are attached to the respective arms 14 of one of the U-shaped frames and a cross bar 50 is arranged to extend across the frame from one arm rest to the other. The ends of the bar 50 are bent down at 54 to engage within apertures formed in the arm rest. The cross bar 50 serves in part to support the hammock structure when the device is used as a seat, in that it prevents the arms 14 from being bent inward or outward and thus out of shape. The cross bar 50 also serves in part to prevent the child from falling forwardly out of the seat, and in part to carry decorative beads 56 for amusement of the child.

Supporting means or hangers 58 are provided at one end of the frame (here for convenience in description but without limitation being referred to as the rear end) for use in supporting one end of the device (either when in the form of a bed or in the form of a chair) from the back of the automobile seat. When used as a bed the other end of the frame is supported by the legs 22 which rest on the automobile seat. As illustrated, one hanger 58 is placed at each corner of the frame at one end thereof. Each hanger is in the form of a U-shaped hook and comprises the bridge piece 60 and diverging legs 62 and 64. The legs 62 and 64 are of different lengths each having a terminal portion, constituting a stop element or button 66 and 68 respectively, which projects at right angles to the plane of the legs, one in one direction and one in the other direction. To attach the hangers to the frame there is provided at each corner a loop 70 which is pivotally attached to the frame by the rivet 28 so as to be free to turn thereon. The loop is large enough to permit the hanger to slide and turn therein but not large enough to permit the terminal portion 66 or 68 to pass through the loop. As thus constructed the hangers can be moved in the loops to engage the button at the lower extremity of either the leg 62 or the leg 64 with the loop and hence to change the heightwise position at which the device will hang from the back of the seat, Fig. 2. When the device is used as a bed, the hangers will be so disposed that the button 68 at the lower end of the longer leg 64 of each hanger is engaged with the respective loop 70 whereas, when the device is used as a chair, the button 66 at the lower end of the shorter leg 62 of each hanger will be positioned to engage the corresponding loop 70. In order to reverse the position of a hanger from that of Fig. 2, for example, it is grasped and slid through the loop 70 until the button or terminal portion 68 is adjacent to the loop 70. Thereupon the bridge piece 58 is swung inwardly towards the frame about a vertical axis and in a substantially horizontal plane until it is substantially parallel to the plane of the frame, thus turning through substantially 180° of rotation about the axis of the leg. Then the entire hanger is swung in a vertical plane while the loop 70 turns about the axis of the rivet 28 until the bridge portion 60 of the hanger is uppermost and in a substantially horizontal position and with the terminal portion 68 engaging the loop. A reverse procedure will restore the hanger to the position of Fig. 1. These several operations are indicated in broken lines in Fig. 6.

When it is desired to use the device as a seat, the U-shaped frame part comprising the member 16 and the legs 18, is swung downwardly about the axes of the rivets 20 until the arms 18 are substantially at right angles to the arms 14 and until the supporting legs 22 are in a substantially horizontal plane with the transverse member 24 which connects the legs 22 engaging the transverse span member which connects the legs 22 at the opposite end of the device, as indicated in broken lines in Fig. 2. The U-shaped frame comprising the end member 16 and the arms 18 is slightly narrower than the frame comprising the end member 12 and the arms 14 and thus when the parts are folded to the position shown in broken lines in Fig. 2 the transverse member 24 which connects the horizontally disposed legs 22 may enter between the legs 22 of the vertically disposed leg structure to form a rigid boxlike seat frame.

It is apparent with the foregoing construction that the device may be used in an automobile either in the form of a bed or seat. When in the form of a bed the hangers 58 support one end thereof on the back of the front seat while the legs 22 at the opposite end rest on the back seat. When folded into the form of a seat the hangers 58 when repositioned support the chair against the back of the front seat above the seat itself.

It should be understood that the present disclosure is for the purpose of illustration only and that this invention includes all modifications and equivalents which fall within the scope of the appended claims.

I claim:

1. In a car bed capable of being converted to a car seat for infants, a frame which, when the device is used as a bed, is substantially rectangular, hangers for supporting one end of the frame on a car seat back, each of said hangers comprising a bridge piece and spaced legs, each hanger being designed to embrace the top and front and rear sides of a car seat back, one of said legs being longer than the other, and means anchoring each hanger to the frame so that optionally it may have either of two positions, in one of which the lower end of its shorter leg anchors the hanger to the frame and in the other of which the lower end of its longer leg anchors it to the frame.

2. In a car bed capable of being converted to a car seat for infants, a frame which, when the device is in use as a bed, is substantially rectangular, hangers, one at each corner at one end of the frame for supporting that end of the frame on the back of a car seat, each hanger comprising a bridge portion and legs, one of the legs being longer than the other, and means connecting each hanger to the frame for optional use in either of two positions, each hanger being movable relatively to its connecting means so that in one position the lower end of the shorter leg engages the connecting means and in another position the lower end of the longer leg engages the connecting means, each leg being provided with means to prevent its disengagement from the connecting means.

3. In a car bed capable of being converted to a car seat for infants, a frame which, when arranged to form a bed, is substantially rectangular, hangers for supporting the frame from the back of a car seat, each hanger comprising a bridge portion and legs, one of the legs being longer than the other, a loop pivotally anchored to the frame at each side at one end thereof, each hanger being engaged with one of the respective loops and being slidable in the corresponding loop from a position in which the lower end of one of its legs is engaged with the loop to a position in which the lower end of the other of its legs is engaged with the loop, and means at the ends of each of the legs to prevent disengagement of said leg from the loop.

4. In a car bed capable of being converted to a car seat for infants, a frame which, when the device is used as a bed, is substantially rectangular, hangers for supporting the frame from the back of a car seat, each hanger being substantially U-shaped and having a bridge portion and two legs, one leg being of greater length than the other, a loop pivotally attached to each corner of the frame at one end thereof, each hanger being attached to the frame by one of said loops respectively, each hanger having a stop element adjacent to the free end of each of its legs respectively and each hanger being movable relatively to its loop to permit engagement of either of said stop elements with the loop by sliding the hanger through the loop so as to bring either stop element into engagement with the loop, the parts being so constructed and arranged that the hanger may be swung outwardly from the frame through substantially 180° of rotation about a vertical axis and may then be slid through the loop about the pivotal axis of the loop until the bridge portion of the hanger is uppermost and substantially horizontal.

5. In a car bed capable of being converted to a car seat for infants, a frame which, when the device is used as a bed, is substantially rectangular, hangers for supporting the frame from the back of a car seat, each hanger being U-shaped and comprising a bridge portion and two legs, one of the legs being of greater length than the other, each leg having a stop element adjacent to its free end, a loop pivotally attached to each corner of the frame at one end, the pivotal axis of each loop being substantially horizontal, each hanger being slidably mounted in one of the respective loops for movement so as optionally to engage the stop element at the end of either its longer or its shorter leg with the loop, said movement of the legs from one position to the other being effected by sliding the hanger through the loop until the stop element of the opposite leg is engaged with the loop, then swinging the hanger inwardly towards the frame through an arc of substantially 180° about the axis of that leg which is then engaged with the loop and then swinging the loop about its pivotal axis until the bridge piece of the hanger is uppermost and substantially horizontal.

6. In a car bed capable of being converted to a car seat for infants, a frame which, when the device is in use as a bed, is substantially rectangular, hangers for supporting the frame from the back of a car seat, each hanger being substantially U-shaped and comprising a bridge piece and two legs, one leg being of greater length than the other, the bridge piece and each leg of each respective hanger lying in the same plane but each leg having a terminal end portion which projects therefrom in opposite directions respectively from said respective common plane, a loop pivotally attached to each corner of the frame at one end, the pivotal axis of each loop being substantially horizontal, the loops connecting the hangers to the frame and being so devised that each hanger may slide within its respective loop so that the terminal portion of either leg of the hanger may be engaged with its respective loop, each hanger being movable from one position to another by sliding the hanger within its loop until its opposite terminal portion is engaged with the loop, swinging the hanger about the axis of the leg which then engages the loop through an arc of approximately 180° and then swinging the hanger and loop about the axis of the loop pivot until the bridge piece of the hanger is uppermost and is substantially horizontal.

References Cited in the file of this patent

UNITED STATES PATENTS

| | | |
|---|---|---|
| 834,383 | Johnson | Oct. 30, 1906 |
| 1,010,812 | Schuttleworth | Dec. 5, 1911 |
| 1,279,606 | Strid | Sept. 24, 1918 |
| 1,337,103 | Straith | Apr. 13, 1920 |
| 1,377,868 | Bezold | May 10, 1921 |
| 2,508,688 | Rossi | May 23, 1950 |
| 2,586,237 | Linden | Feb. 19, 1952 |